US008317576B2

(12) United States Patent  
McFarland

(10) Patent No.: US 8,317,576 B2  
(45) Date of Patent: Nov. 27, 2012

(54) APPARATUS AND METHOD FOR ADJUSTING CLEARANCE BETWEEN A SCREW AND SCREEN IN A MACHINE FOR SEPARATING COMPOSITE MATERIALS

(76) Inventor: A. Rae McFarland, Riverton, UT (US)

( * ) Notice: Subject to any disclaimer, the term of this patent is extended or adjusted under 35 U.S.C. 154(b) by 0 days.

(21) Appl. No.: 13/316,306

(22) Filed: Dec. 9, 2011

(65) Prior Publication Data

US 2012/0178350 A1    Jul. 12, 2012

Related U.S. Application Data

(60) Provisional application No. 61/421,344, filed on Dec. 9, 2010.

(51) Int. Cl.
*A22C 17/00* (2006.01)
(52) U.S. Cl. ...................................................... 452/138
(58) Field of Classification Search ............... 452/135, 452/138, 106, 111–114, 120, 124; 241/74, 241/82.3, 823, 247, 260.1
See application file for complete search history.

(56) References Cited

U.S. PATENT DOCUMENTS

| | | | | | |
|---|---|---|---|---|---|
| 4,189,104 | A | * | 2/1980 | dos Santos | 241/82.3 |
| 4,566,640 | A | * | 1/1986 | McFarland et al. | 241/74 |
| 4,638,954 | A | * | 1/1987 | Poss | 241/74 |
| 5,160,290 | A | * | 11/1992 | Richburg | 452/135 |
| 5,213,541 | A | * | 5/1993 | Richburg et al. | 452/135 |
| 5,580,305 | A | * | 12/1996 | McFarland | 452/138 |
| 5,749,776 | A | * | 5/1998 | Evans | 452/138 |
| 7,922,567 | B2 | * | 4/2011 | Gulak | 452/138 |

* cited by examiner

*Primary Examiner* — Richard Price, Jr.
(74) *Attorney, Agent, or Firm* — Thorpe North & Western LLP

(57) ABSTRACT

A desirably close clearance between outer edges of the flights of a conveying screw and the inside surface of a separator housing and screen can be obtained by offsetting the axis of the screw within the screen and by rotating the axis of the screw about the axis of the separator housing. Adjustments to the amount of such offset of the screw axis can be made in steps as the outer edges of the flights on the conveying screw wear.

9 Claims, 3 Drawing Sheets

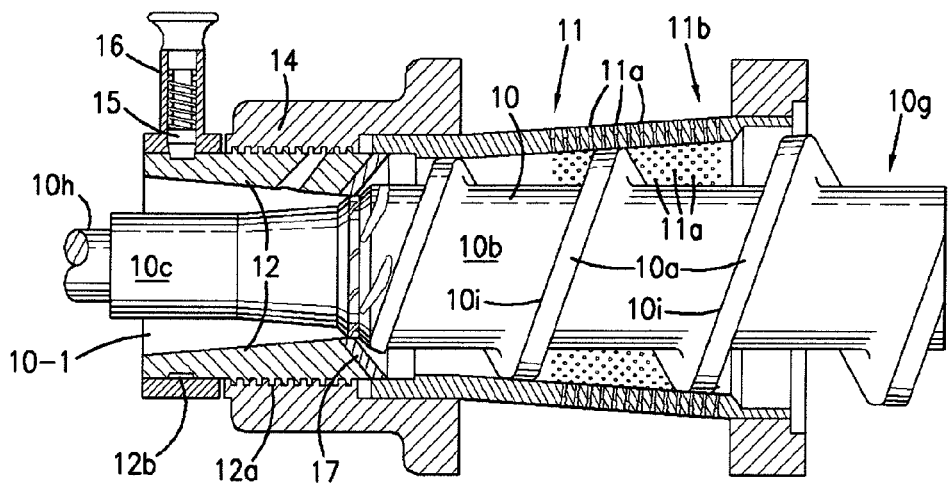
FIG. 1
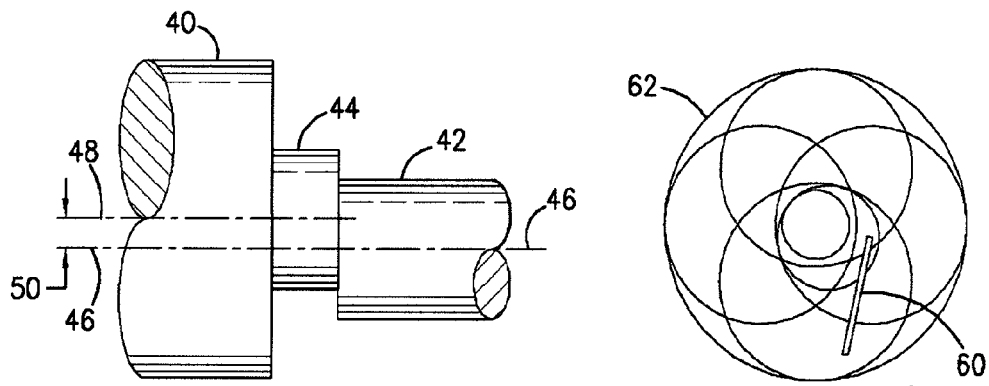
FIG. 3
FIG. 9
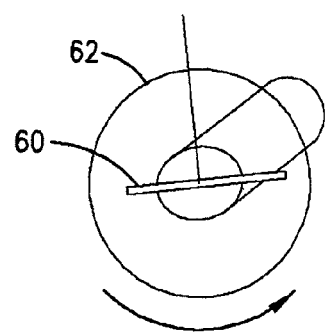
FIG. 10

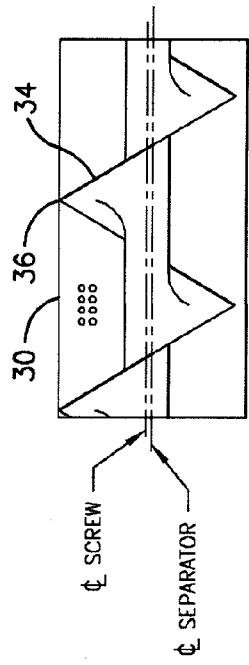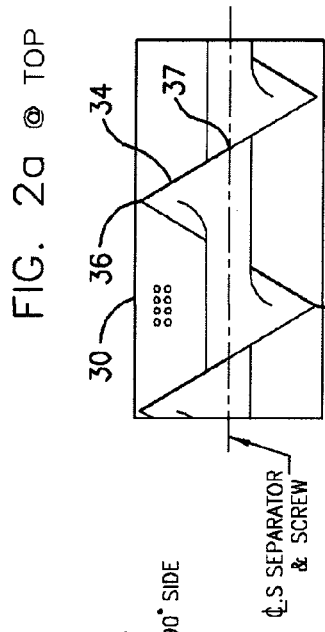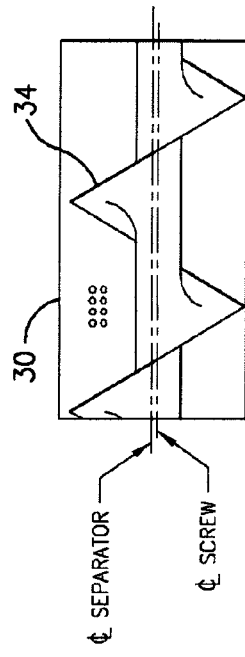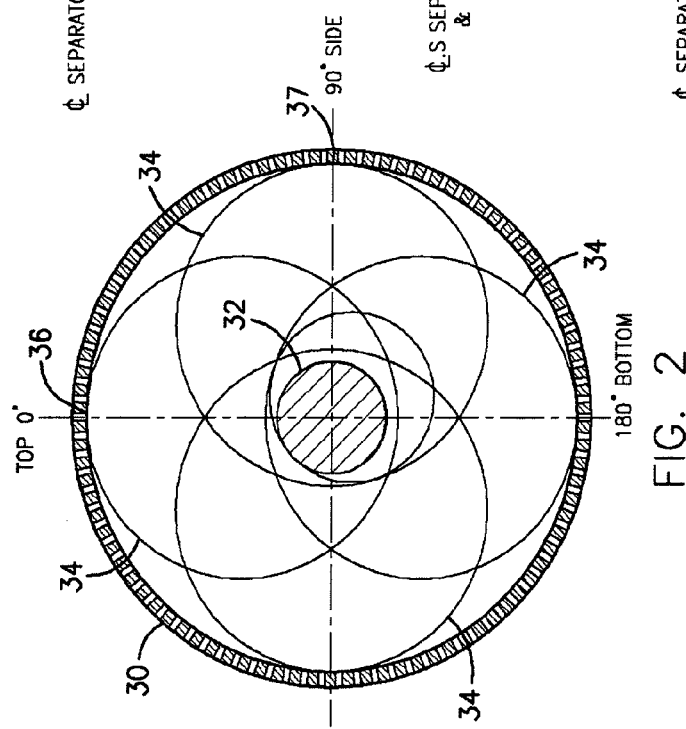

APPARATUS AND METHOD FOR ADJUSTING CLEARANCE BETWEEN A SCREW AND SCREEN IN A MACHINE FOR SEPARATING COMPOSITE MATERIALS

PRIORITY CLAIM

This application claims the benefit of Provisional Application Ser. No. 61/421,344 filed on Dec. 9, 2010, which is hereby incorporated herein by reference in its entirety.

BACKGROUND

1. Field of the Invention

The present invention relates generally to separating machines for receiving pieces of bony meat or fish, or other food materials containing relatively soft and relatively hard components, and for separating the meat and other soft components from the bone and other hard components. As applied to bony meat or fish, such machines are often referred to as deboning machines.

2. Related Art

In many machines for separating relatively soft and relatively hard components from material having both the relatively soft and relatively hard components to be separated, the material having both the relatively soft and relatively hard components, such as bony pieces of meat or fish where the relatively soft meat is to be separated from the relatively hard bone, are fed into a separator housing having a generally cylindrical screen with a multitude of small perforations therein. A pressure auger or conveying screw is rotatable within the screen. The conveying screw develops pressure which presses the meat and/or other soft materials through the perforations of the screen, while the particles of bone and/or other hard materials are propelled by the conveying screw to the discharge end of the separator housing from which the hard particles are discharged through a restricted orifice formed by an annular valve which maintains pressure in the separator housing.

A close clearance should be maintained between the outer edges of the screw flights of the conveying screw and the inside surface of the screen. The desired close clearance may be such as to allow creation of a thin filter mat between the conveying screw and the inside surface of the screen, for example as taught by McFarland U.S. Pat. Nos. 3,739,994 and 4,566,640. Alternately, the desired close clearance may provide for the outer edges of the screw flights to bear closely against the inside surface of the screen so that no filter mat is created and so that the outer edges of the screw flights form a continuous spiral blade bearing closely against the inside surface of the screen to effect a strong cutting action relative to the perforations along the length of the screen, thereby avoiding the creation of a filter mat, for example as taught by McFarland U.S. Pat. No. 5,580,305. In either case, since the outer edges of the screw flights are subject to wear as the machine is used, it is important to be able to adjust and maintain the desired clearance between the outer edges of the screw flights of the conveying screw and the inside surface of the screen. When the screen is tapered to form a frusto-conical shape and the outer edges of the screw flights are similarly tapered along the length of the screw, the clearance between the outer edges of the screw and the inner surface of the screen can be adjusted by adjusting the axial positioning of the screw within the screen, for example as shown by McFarland U.S. Pat. No. 5,580,305. However, where the screen and screw flights are not tapered, such adjustment is not available.

SUMMARY OF THE INVENTION

According to the invention, a desirably close clearance between outer edges of the flights of a conveying screw and the inside surface of a separator housing and screen can be obtained by offsetting the axis of the screw within the screen and by rotating the axis of the screw about the axis of the separator housing. Adjustments to the amount of such offset of the screw axis can be made in steps as the outer edges of the flights on the conveying screw wear. Offsetting the axis of the conveying screw with respect to the axis of the separator housing moves the outer edges of flights of the conveying screw along one side of the conveying screw closer to the inside surface of the separator housing adjacent the one side of the conveying screw to reestablish the desired clearance along that side of the screw, but moves the outer edges of flights of the conveying screw along the opposite side of the conveying screw father away from the inside surface of the separator housing adjacent such opposite side of the conveying screw. However, by rotating the axis of the conveying screw about the central axis of the separator housing, the portion of the screw with the reestablished clearance rotates completely around the inside surface of the separator housing.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1 is a fragmentary, vertical, longitudinal section taken axially through and along the screen and the conveying screw portion of a typical segregating machine of the prior art in which the current invention can be used;

FIG. 2 is a schematic showing of an offset conveying screw rotating in a separation housing;

FIGS. 2a-2c are schematic showings of the positions of the conveying screw flights with respect to the separation screen at various indicated locations in FIG. 2;

FIG. 3 is a schematic representation of an offset attachment of a conveying screw to a drive shaft;

FIG. 9 is a schematic showing of an offset blade assembly rotating against a flat grinder screen; and FIG. 10 is a further schematic showing of an offset blade assembly rotating against a flat grinder screen.

Figure 6:
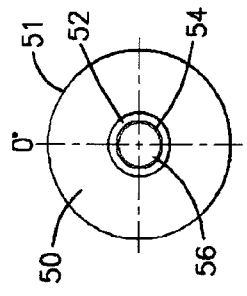
FIG. 6 is an end representation of the arrangement of FIG. 4.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

FIG. 1 shows a separating section of an example of a prior art machine for separating relatively soft meat from relatively hard bones and heavy tissue, such as tendons and gristle, and skin, found in bony pieces of meat and fish. As illustrated in FIG. 1, which is taken from referenced U.S. Pat. No. 5,580,305, the separating portion of the machine for separating relatively soft materials, such as meat, from relatively hard materials, such as bone, from a mixture of such materials, such as pieces of bony meat or fish, comprises a conveying screw or auger 10 having a spiral flight 10a and extending through and adapted to rotate within a separator housing 11 forming a perforate tubular conduit or screen 11b, while conveying pieces of meat and bone and other relatively heavy tissue, such as tendons and gristle, and skin, along the interior of separator housing 11 from a feed end 10g of such screw which receives the material to be treated, to a discharge end portion 10b thereof and through a final outlet opening 10-1 surrounding an end extension 10c of such conveying screw after end portion 10b passes through a usual adjustable ring valve 12. Pressure is created in the separator housing 11 by conveying screw 10 which forces the soft material (meat) through the multitude of perforations 11a therein forming the screen.

As is typical of adjustable ring valves of machines of the type concerned, adjustable ring valve 12 is elongate, externally threaded, as at 12a, and rotatable within an internally threaded housing member 14 for back and forth, longitudinal, position-adjusting movement relative to such housing member 14 and to the discharge end portion 10b of cutter screw 10 and the end extension 10c thereof. A spring-activated pawl 15, mounted within a housing member 16 and engaging a ratchet wheel portion 12b of cutting ring 12, provides for manually turning of ring 12 in the appropriate direction for screwing such ring forwardly or backwardly to adjust the opening for discharge of the hard materials to maintain pressure in the separator housing 11.

Conveying screw 10 is supported with respect to separator housing 11 by mounting structure, not shown, which positions conveying screw 10 in separator housing 11 so that the central axis of conveying screw 10 is aligned with the central axis of separator housing 11. The mounting structure may connect the end of the feed end 10g of conveying screw 10 to a source of material to be separated, such as to a material pump or supply bin, and may journal an end shaft 10h extending from the screw end extension 10c for rotation. Power for rotation of the conveying screw 10 can be provided at either end of the conveying screw.

It is important in such machines to maintain a desired close clearance between the outer edges of the screw flights 10a of the conveying screw 10 and the inside surface of the separator housing screen 11b. The desired close clearance may be such as to allow creation of a thin filter mat between the outer edges of the flights of the conveying screw and the inside surface of the screen, for example, typical clearances are between about 0.004 and 0.0001 inch as taught by McFarland U.S. Pat. No. 4,566,640. With such clearance, the outer edges of the screw flights 10a will cut away excess thickness of the filter mat to maintain it as a thin layer of a desired thickness. Alternately, the desired close clearance may provide for the outer edges of the screw flights 10a to bear closely against the inside surface of the screen 11b so that no filter mat is created and so that the side edges 10i of the outer edges of the screw flights 10a form a continuous spiral blade bearing closely against the inside surface of the screen to effect a strong cutting action relative to the perforations 11a along the length of the screen. In either case, since the outer edges of the screw flights are subject to wear as the machine is used, it is important to be able to adjust and maintain the desired clearance between the outer edges of the screw flights of the conveying screw and the inside surface of the screen.

In many of the prior art machines, such as the one shown in FIG. 1, the tubular screen 11 is tapered to some extent and thus is frusto-conical in shape. The outer edges of the flights 10a of the conveying screw 10 are similarly tapered so that the desired close clearance between the outer edges of the screw flights 10a of the conveying screw 10 and the inside surface of the separator housing 11 is provided at least along the length of the screen 11b. With such tapered configuration, it is known to provide an adjustable bearing assembly to support the end shaft 10h of the conveying screw. Such adjustable bearing assembly incorporates adjusting means whereby the position of the conveying screw 10 can be adjusted longitudinally along its axis with a high degree of precision to provide for precise adjustment of the clearance between the outer edges of the conveying screw flights 10a and the internally tapered separator housing 11. This adjustment of the clearance is possible because of the tapered configuration of the separator housing 11 and conveying screw 10. No clearance adjustment means is known for a separator body and conveying screw of constant diameter.

While maintaining the clearance between the outer edges of the screw flights of the conveying screw and the inside surface of the screen is important, the inventor has found that it is not necessary that this clearance is maintained around the entire inner surface of the screen at all times, but only that the desired clearance is provided at short intervals around the inside surface of the screen, for example once during each rotation of the screw in the screen, to provide the filter mat trimming or the inside surface cutting. Therefore, the inventor has found that the effectiveness of the separation provided by the separation machines can be maintained through a range of wear of the conveying screw by offsetting the axis of the conveying screw with respect to the axis of the screen and then rotating the axis of the conveying screw to rotate the offset screw around the inside surface of the screen to provide the filter mat trimming or the surface cutting. FIG. 2 is an exaggerated schematic showing of the result of offsetting the axis of the conveying screw in the separator housing and then rotating the offset axis of the conveying screw. The circle 30 represents the inside of the separator housing. Circle 32 represents the screw drive shaft aligned with the axis of the separator housing 30. The circles 34 represent an offset conveying screw in different positions as the offset axis of the conveying screw rotates in its offset position with respect to the screw drive shaft 32. It can be seen that as the conveying screw rotates in its offset position, one side of the conveying screw will be closer to the separator housing and will provide the approximate desired clearance between an outer edge of the screw flights and the inner surface of the separator housing. The positions of the flights of the conveying screw at a particular cross section of the conveying screw at three indicated positions of the screw within the separator housing are shown by FIGS. 2a, 2b, and 2c. Thus, when the conveying screw 34 is in the upper position shown in FIG. 2, the outer edges 36 at the top of the conveying screw flights as shown in FIG. 2a are positioned with the desired clearance with respect to the top of the screen 30. When the conveying screw 34 is in the right hand side position shown in FIG. 2, the outer edges 36 of the conveying screw flights at the top and bottom of the conveying screw 34 are spaced from the screen as shown in FIG. 2b and the outside edges of the conveying screw flights at the side of the screw at 37, behind the screw in FIG. 2*b*, are positioned with the desired clearance with respect to the side of the screen 30. When the conveying screw 34 is in the lower position shown in FIG. 2, the outer edges 36 of the conveying screw flights at the bottom of the conveying screw as shown in FIG. 2*c* are positioned with the desired clearance with respect to the bottom of the screen 30. As can be seen, as the offset conveying screw axis is rotated around the axis of the screw drive shaft 32, which is also the separation housing axis, an outside edge of the conveying screw flights passes the inside surface of the separation housing with the desired clearance. The exaggeration in FIG. 2 is of the small diameter of the conveying screw 34 compared to the diameter of the inside surface of the separation housing and the amount of offset of the conveying screw from the screw drive shaft.

FIG. 3 is a schematic showing of an offset mounting of a conveying screw 40 on a screw drive shaft 42, using an offset mounting 44. The screw drive shaft axis 46 is aligned with the separator housing axis within which the conveyor screw 40 is positioned. The offset mounting 44 is mounted between the end of conveying screw 40 and the end of screw drive shaft 42, and provides an offset of conveying screw axis 48 of a distance 50.

Since the outer edges of the flights of the conveying screw will wear progressively, the offset of the conveying screw with respect to the separator housing axis and the screw drive shaft aligned therewith should be able to be done in small steps so that the offset can be adjusted in small steps from time to time as the flights wear. Further, since one purpose of the conveying screw is to convey the materials to be separated along the inside surface of the separator housing and to create a pressure on such materials inside the separator housing so as to extrude the soft materials through the perforations of the screen, the conveying screw has to maintain its ability to move such materials and to create pressure. This places a limit on the distance between the top edges of the flights of the screw and the inside surface of the separator housing at any location around the inside surface of the separator housing. The largest distance between the top edges of the flights of the screw and the inside surface of the separator housing will be the distance of the offset and will occur at the side of the conveying screw opposite the side of the least or desired clearance. This can be seen from FIG. 2. While this maximum distance may vary depending upon the materials to be separated and the requirements of such separation, the inventor believes that a maximum for such distance of offset is about one-eighth of an inch.

In use, a new conveying screw will be installed in the machine with no offset so the axis of the conveying screw is aligned with the axis of the screw drive shaft which is aligned with the separator housing axis. The machine is operated. As the flights of the conveying screw wear to a certain small degree, enough to start to interfere with the separation performance of the machine, the mounting of the conveying screw to the screw drive shaft is adjusted to offset the axis of the conveying screw by a distance about equal to the wear which has occurred to the outer edges of the conveying screw flights. The machine is again operated, which results in further wear to the outside edges of the conveying screw flights. When this additional wear is enough to start to interfere with the separation performance of the machine, the mounting of the conveying screw to the screw drive shaft is again adjusted to further offset the axis of the conveying screw by an additional distance about equal to the additional wear which has occurred to the outer edges of the conveying screw flights. The machine is again operated, which results in further wear to the outside edges of the conveying screw flights. The above steps are repeated until either the amount of offset available has been used or until the amount of offset begins to interfere with the separation performance of the machine. At that time, a new conveying screw is installed into the machine and the process starts over.

Figure 7:
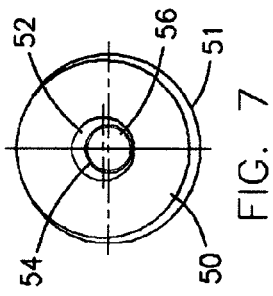
FIG. 7 is an end representation of the arrangement of FIG. 5.
Figure 8D:
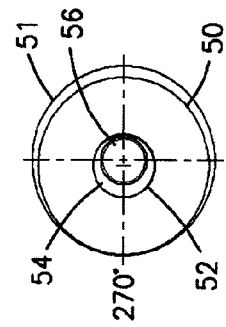
FIGS. 8a-8d are representations of various indexed positions of a conveying screw in relation to a drive shaft.
Figure 4:
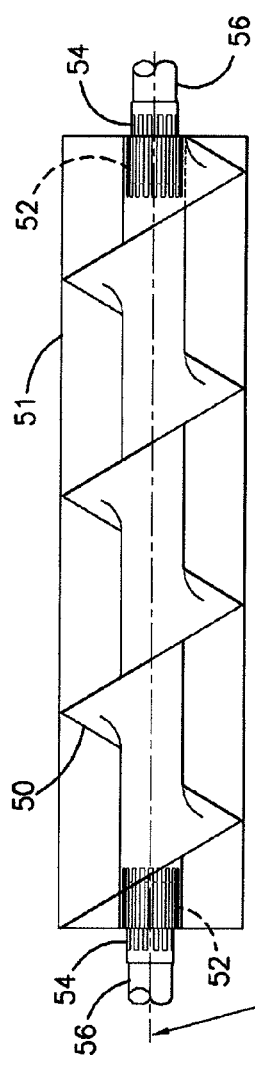
FIG. 4 is a representation of a conveying screw centered in a separation housing.
Figure 5:
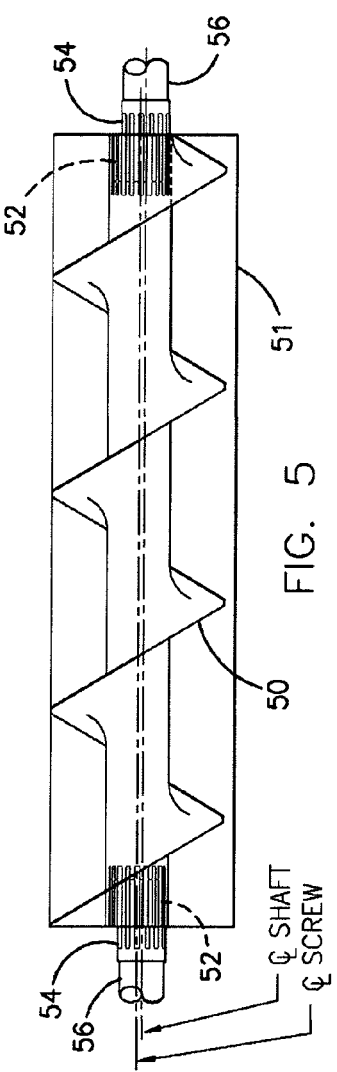
FIG. 5 is a representation of a conveying screw in a separation housing similar to that of FIG. 4, but showing the conveying screw offset in the housing.
Figure 8C:
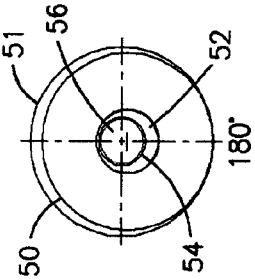
Figure 8B:
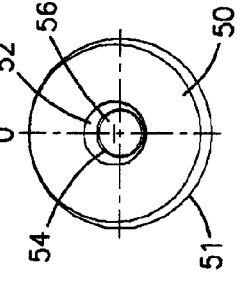
Figure 8A:
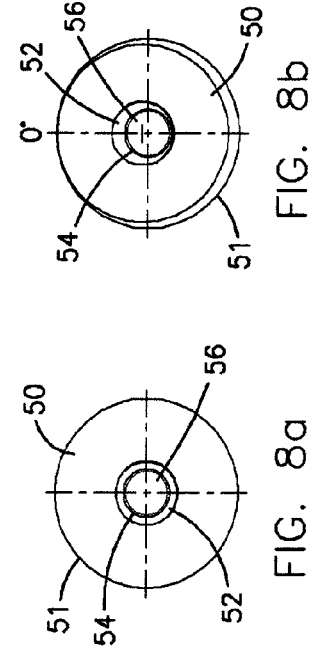

FIGS. 4-8*d* show one example embodiment for adjustable offset mounting of the conveying screw. Each end of a hollow auger or conveying screw 50, FIGS. 4 and 5, shown in separator housing 51, is fitted with spline recesses 52 to receive splined sections 54 on the end of solid drive shafts 56. The splined recesses 52 and the splined sections 54 are configured so that as the conveying cylinder 50 is rotated with respect to the received splined section 54, the conveying cylinder is moved from zero offset FIG. 4 to maximum offset. The splined recess 52 and splined section 54 can be locked at a plurality of rotated positions to provide a plurality of offset positions. For example, the splined recess can have up to about ninety spline slots machined therein. If ninety slots are provided, the slots are provided at four degree intervals around 360 degrees from the starting point. With such arrangement, the axis of the conveying screw can be indexed (offset) up to ninety times from zero offset to maximum offset at 360 degrees index. If the total offset from zero to 360 degree index is about one-eighth inch, the total offset is broken down into ninety steps. Once the maximum offset adjustment is reached, the conveying screw is removed and replaced with a new or resurfaced conveying screw and the indexing begins again. The drive shaft and the conveying screw are locked in place with double tapered locking rings fitted to the splined drive shaft. FIGS. 4 and 6 show the mounting and indexing to align the conveying screw axis with the drive shaft axis (no offset), while FIGS. 5 and 7 show the mounting and indexing rotated to provide an offset to the conveying screw 50. FIGS. 8*a*-8*d* show various indexing of the conveying screw and the drive shaft.

Various other methods of adjustment can also be used. For example, the offset mounting 44 shown in FIG. 3 may be a sliding connection between the conveying screw 40 and the screw drive shaft 42 with a bolt or other means for adjusting the degree of offset along the sliding connection. Further, the whole screw drive shaft can be mounted for offsetting movement.

While set amounts of offset adjustment will usually be intermittently manually provided to the conveying screw, automatic adjustment can be provided. For example, referring to FIG. 3, offset mounting 44 may be a flexible mounting or a spring loaded mounting which will be biased to maximum offset, but may be moved against the bias to lesser offsets. When a new conveying screw is installed, the offset mounting 44 is moved against the bias to align the conveying screw axis with the separator housing axis. Then, as wear of the conveying screw flights occurs, the bias of the offset mounting 44 continuously adjusts the offset of the conveying screw until maximum offset is reached. Care must be taken to not use a bias force that will significantly increase the wear of the conveying screw.

In mounting and providing offsets of the conveying screw with respect to the drive shaft or the axis of the separation housing, both ends of the conveying screw will generally be similarly offset. The offsetting of the conveying screw can be used with both constant diameter tubular screens and with tapered tubular screens.

Further, while the invention has been described specifically with regard to a tubular screen for separating the soft material from the hard material, an offset cutter axis can be used in a separating machine which uses a flat plate grinder screen in conjunction with a multibladed rotary knife assembly, such as described in U.S. Pat. No. 6,149,083. In such instance, the axis for rotation of the rotary knife assembly can be offset from the center of the flat plate grinder screen so that the knife assembly provides a different cutting and scrubbing action of the knives against the plate to improve the fiber and ground texture of the soft material passing through the plate and an improved scrubbing motion for cleaning the dischargable hard particles and defects from the plate and to the defect and hard material discharge. Further, the offset can provide a varying, free floating action to the knives which may be held in loose self aligning position to the grinder plate. Such offset arrangement of the knives in relation to a flat plate is shown in FIGS. 9 and 10 which show the offset rotation of a knife assembly 60 against a plate screen 62.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A machine for segregating relatively soft material and relatively hard material from a mixture of said materials, comprising an open-ended, perforate, tubular conduit as a soft material-passing screen through which the soft material is extruded; a conveying screw within said conduit for advancing the relatively hard material as introduced into said conduit at one open end thereof and for discharging such relatively hard material at the other open end thereof, said screw having a discharge end portion at said other end of the conduit, and said screw having a screw central axis; and mounting structure positioning the conveying screw within the tubular conduit, said mounting structure being adjustable to adjust the position of the screw central axis in the tubular conduit and for rotating the screw central axis in the tubular conduit.

2. A machine for segregating relatively soft material and relatively hard material from a mixture of said materials, according to claim 1, wherein the tubular conduit has a conduit central axis, and wherein said mounting structure is adjustable to substantially align the screw central axis with the conduit central axis and to offset the screw central axis from the conduit central axis.

3. A machine for segregating relatively soft material and relatively hard material from a mixture of said materials, according to claim 2, wherein the mounting structure adjusts the screw central axis between substantial alignment with the conduit central axis and a maximum offset from the conduit central axis in a series of steps.

4. A machine for segregating relatively soft material and relatively hard material from a mixture of said materials, according to claim 3, wherein the maximum offset is in the range of between one-sixteenth inch and one-eighth inch.

5. A machine for segregating relatively soft material and relatively hard material from a mixture of said materials, according to claim 4, wherein the number of steps in the series of steps is in the range of two to ninety.

6. A machine for segregating relatively soft material and relatively hard material from a mixture of said materials, according to claim 5, wherein the mounting structure includes a rotatable shaft aligned with the conduit central axis and an adjustable attachment of the rotatable shaft to the screw central axis and wherein the adjustment of the position of the screw central axis in the tubular conduit is made by adjustment of the adjustable attachment of the screw central axis to the rotatable shaft.

7. A machine for segregating relatively soft material and relatively hard material from a mixture of said materials, according to claim 6, wherein the adjustable attachment of the rotatable shaft to the screw central axis includes an eccentric splined connector wherein rotation of the connector establishes the amount of offset.

8. A machine for segregating meat from bone and from heavy tissue and skin of segmented pieces of meat cuts, comprising an open-ended, perforate, tubular conduit as a meat-passing screen through which the meat is extruded; a conveying screw within said conduit for advancing pieces of meat and any accompanying bone, heavy tissue, and skin as introduced into said conduit at one open end thereof and for discharging such bone, heavy tissue, and skin at the other open end thereof, said screw having a discharge end portion at said other end of the conduit, said screw having a central axis; mounting structure positioning the conveying screw within the tubular conduit, said mounting structure being adjustable to adjust the position of the central axis in the tubular conduit and for rotating the central axis in the tubular conduit.

9. A method for adjusting clearance between a conveying screw and a screen in a machine for separating composite materials to maintain close to a desired clearance between outer edges of flights of the conveying screw and an inside surface of a separator housing forming a screen wherein the conveying screw has an axis and is positioned inside the separator housing forming the screen with the axis of the conveying screw aligned with a central axis of the separator housing, and wherein during use of the machine the outer edges of the flights of the conveying screw wear and increase the clearance between the outer edges of flights of the conveying screw and the inside surface of a separator housing, comprising the steps of offsetting the axis of the conveying screw with respect to the axis of the separator housing to reestablish the desired clearance between the outer edges of flights of the conveying screw along one side of the conveying screw and an inside surface of the separator housing adjacent the one side of the conveying screw, and rotating the axis of the conveying screw about the central axis of the separator housing.

\* \* \* \* \*